Patented Feb. 27, 1940

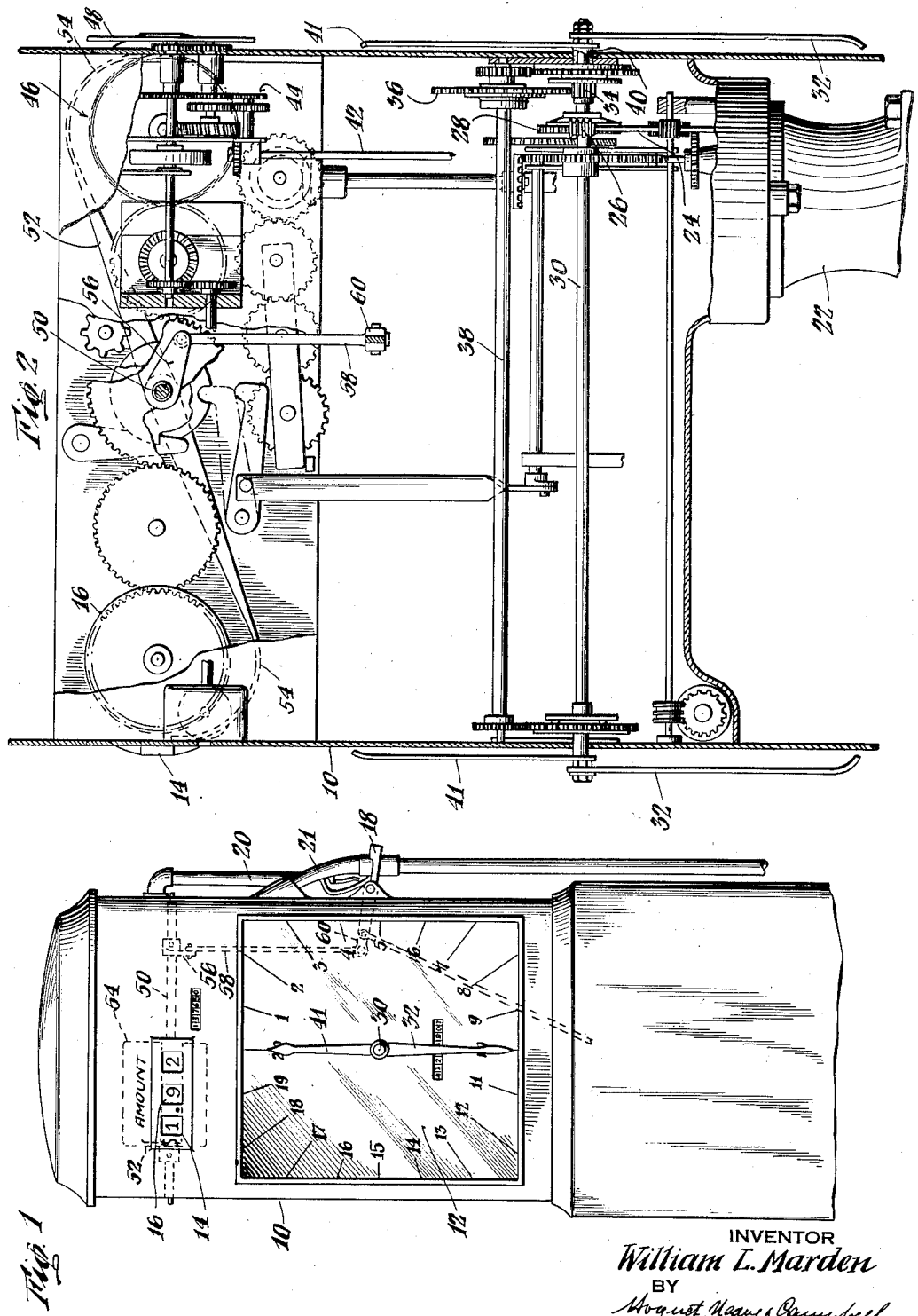

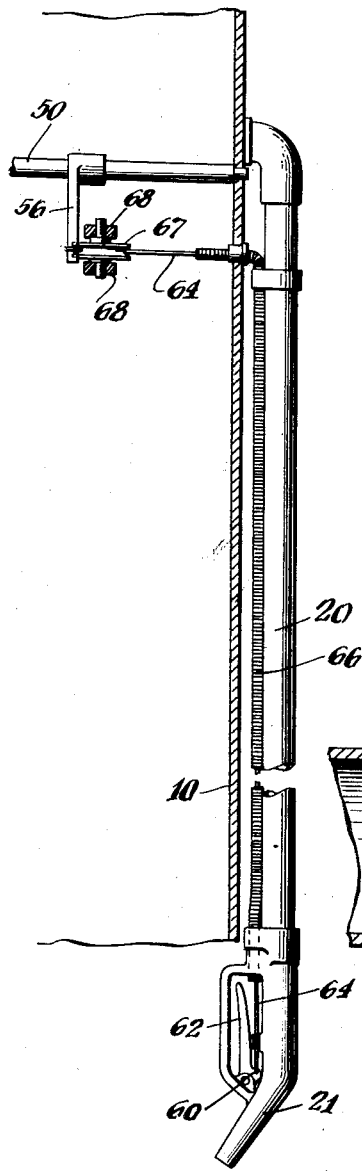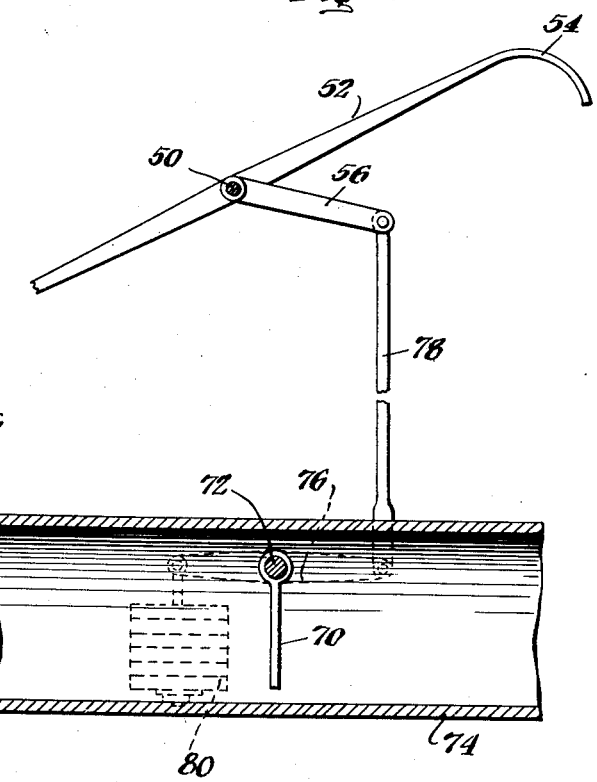

2,191,892

UNITED STATES PATENT OFFICE 2,191,892

SHUTTER FOR DISPENSING PUMPS

William L. Marden, Jackson Heights, N. Y., assignor to Neptune Meter Company, a corporation of New Jersey Application May 8, 1937, Serial No. 141,519

8 Claims. (Cl. 221—95)

This invention relates to dispensing devices of the type including a price indicator and a volume indicator actuated in response to flow of liquid through a meter to indicate visually the price and volume of the liquid dispensed. The invention includes a novel arrangement for preventing visual price registration during a dispensing operation.

Dispensing pumps having both price and volume indicators are in common use and have proven commercially successful for dispensing gasoline, for example, both because of the facility with which the price of the gasoline may be determined by the attendant and because of the convenience afforded the customer in buying gasoline by price, rather than volume. However, the Sealers of Weights and Measures of most states have no control over purchases based on total price and, therefore, a customer requesting, say, one dollar's worth of gasoline may be given any amount the attendant desires. Technically, at least, the attendant may deliver short measure for a given price while advertising a lower price per gallon. This practice encourages the operator to dispense gasoline or other liquids by price alone, without disclosing the volume, in order to evade inspection by the authorities determining the accuracy of the dispensing pumps. Because of the inability of the authorities to curb this practice, a number of states have passed laws preventing the sale of gasoline by price and have caused the price registers of pumps already installed to be covered or removed, thus entirely eliminating the advantages of this type of pump.

An object of this invention is to provide dispensing pumps having price and volume registers with a construction which allows both the customer and the attendant to refer to the price register only while no dispensing operation is taking place.

A further object of the invention is to provide a mechanism which is operable to prevent disclosing of the price of the liquid while liquid is being delivered, but is operable to display the registered price when the dispensing operation is terminated.

A still further object of the invention is to provide a shutter operable in response to actuation of means for controlling flow of liquid in the dispensing device for preventing visual registration of price on the price register during a dispensing operation.

Those forms of the invention herein illustrated and described may suitably consist of shutters adapted to conceal the price indicator during a dispensing operation. In one device illustrated, removal of the hose from its support on the pump housing causes the shutter to cover the price indicator and to remain in covering position until the hose is returned to the support. When the shutter mechanism is used with devices which prevent a subsequent dispensing operation unless the indicators have previously returned to zero position, such as for example, the zeroizing mechanism disclosed in the copending applications of Charles S. Hazard, Serial No. 28,036, filed June 24, 1935, and Serial No. 97,132, filed August 21, 1936, the price indicator is only exposed at the conclusion of the dispensing operation. Return of the hose to the hose support so conditions the zeroizing mechanism that the registers must be returned to zero to allow another dispensing operation to take place. Thus, the attendant cannot refer to the price indicator by stopping flow of the liquid and again initiating flow of the liquid. Each dispensing operation must be terminated before the price of the dispensed volume of liquid is rendered visible.

Other forms of devices embodying the invention may include shutter constructions actuated in accordance with the flow of liquid through the delivery system, that is, the actuating mechanism moves the shutter to indicator covering or concealing position while liquid is flowing through the system, and to indicator exposing position when flow of the liquid is terminated.

Additionally, constructions embodying the invention may include means whereby the price register may be prevented from registering the price of liquid dispensed during a dispensing operation but may be actuated at the conclusion of the operation to expose the price of the liquid dispensed during the transaction.

For a better understanding of the invention, reference may be had to the drawings, in which:

Figure 1 is a front view of the upper portion of a gasoline dispensing device embodying a typical form of the present invention;

Figure 2 is a side view of the dispensing device with parts removed and broken away to disclose details of the indicators;

Figure 3 is a side view of a part of a dispensing device, partly broken away, disclosing a modified form of actuating means; and Figure 4 illustrates a further modification of the actuating means for the shutter.

For purposes of illustration, one form of shutter and actuating mechanism therefore are disclosed as applied to a dispensing pump construction such as is shown in the patent to Hazard, No. 2,069,184, dated January 26, 1937.

A typical form of the dispensing pump is shown in Figure 1, and consists of a pump housing 10 having on its front and rear faces volume indicating dials 12 and apertures 14 through which are disclosed drums 16 of a drum type register indicating the price of the liquid dispensed in each dispensing operation. The dispensing pump may be provided with a pivoted hose hook 18 for supporting a dispensing hose 20 and nozzle 21 which are connected through suitable conduits to a meter 22 for measuring the quantity of liquid dispensed. The inlet side of the meter 22 is connected through a suitable conduit to the outlet of a motor actuated pump (not shown), which draws the liquid from a suitable source of supply. The hose support 18 may be connected to the pump motor for initiating operation of the pump when the nozzle 21 is removed from the support 18.

The passage of liquid from the pump through the meter 22 causes actuation of a drive shaft 24 for driving a worm 26 and worm gear 28 mounted on the shaft 30 upon which is carried the hands 32 for indicating fractions of a gallon of liquid dispensed. Rotary movement of shaft 30 is transmitted through reduction gears 34 and 36 to a shaft 38 which drives sleeves 40 journaled on shaft 30 to drive the whole gallons pointer 41 at such a rate that it will be displaced through a distance on the dial 12 equal to one gallon for every revolution of the fractional gallons pointer 30.

The meter 22 also actuates the shaft 42 for driving a variable ratio gear system 44 to actuate the price register 46 in accordance with the price per gallon of liquid. As described more particularly in the patent to Hazard, No. 2,069,-184, dated January 26, 1937, the variable ratio device 44 is controlled by replaceable price targets 48 carrying pairs of gears, each pair of gears being related to the price indicated on the price target 48 and differing in ratio in accordance with the price. The register 46 is of the conventional numeral wheel type, consisting generally of a main drive shaft 50 for rotating segmental and full gears so that for each revolution of the units drum 16, the tens drum will be displaced through one-tenth of a revolution and for each revolution of the tens drum, the dollars drum will be displaced through one-tenth of a revolution. The above described register is conventional and may be replaced by any other suitable form of register.

As above set forth, it is desirable to prevent an indication of price on the price register during a dispensing operation. In one form of device for accomplishing this result, I have mounted an arm 52 on the main drive shaft 50 of the register 46 for pivotal movement with respect thereto. The opposite ends of the arm 52 are provided with curved shutter blades 54 of sufficient width to completely cover the aperture 14 in the housing 10, whereby the drums 16 can be concealed from view. The arm 52 and shutters 54 may be moved into position concealing the drums 16 or out of position exposing the drums 16 in any suitable manner.

The shutters 54 may be moved by a lever 56 connected to the shutter lever 52 and through a link 58 also connected to an extension 60 on the hose support 18 or to the motor switch (not shown). The hose support 18 may likewise be connected to the motor switch for controlling operation of the pump. The hose support 18 and the lever 56 are so related that when the hose nozzle 21 is placed on the hook, the shutter lever 52 will be moved counterclockwise to expose the drum 16 through the aperture 14 in the dispensing pump housing. Upon removal of the nozzle 21 from the hose support 18, the latter may be moved upwardly in a counterclockwise direction and the shutter lever 52 thereby moved in a clockwise direction to dispose the shutters 54 between the drums 16 and the opening 14 in the dispensing pump housing. If desired the shutter arm 52 or the hose support 18 may be suitably weighted to automatically swing the shutters 54 to covering position on removal of the nozzle 21 from the support 18.

Any suitable means may be provided for returning the indicator pointers 30 and 41 to zero position and also for returning the drums 16 of the price register to zero position at the conclusion of a dispensing operation. Such zeroizing mechanisms as those disclosed in the copending applications of Charles S. Hazard, Serial No. 28,036, filed June 24, 1935, and Serial No. 97,132, filed August 21, 1936, may be used to control movement of the hose support so the shutters 54 can move to exposing position only when a dispensing operation is fully terminated. With this construction, the attendant of the gasoline pump is unable to determine what the final price of the gasoline is until he has returned the nozzle 21 to or depressed the outer end of the hose support 18. At that time, the entire device, including the resetting mechanism, will be so conditioned that a subsequent dispensing operation cannot be begun until both the price and volume indicators are returned to zero position. Therefore, if the attendant moves the hose support to read the price indicator, he must zeroize the device before he can again dispense liquid. This effectually prevents the attendant from attempting to dispense liquid by price alone.

A modified form of actuating mechanism for the shutter is disclosed in Figure 3 and may consist of mechanism connecting the valve actuating handle on the dispensing nozzle 21 with the shutter arm 52. This construction may consist of a bell-crank arm 60 on the valve actuating handle 62, which is connected through a flexible cable 64 extending through a tube 66 on dispensing hose 20 to the lever 56 on the shutter arm 52. The cable 64 may be passed over a pulley 66 mounted between lugs 68 on the framework of the register 46 so that when the handle 62 on the nozzle is depressed to allow liquid to be delivered from the nozzle, the shutter arm 52 is rocked in a clockwise direction to cover the drums 16 on the price register. Upon release of the valve handle 62, the shutter lever 52 is rotated in a counterclockwise direction, exposing the price register drum 16 through the aperture 14 in the dispensing pump housing.

The above described construction prevents visible registration of price while liquid is being delivered from the dispensing device. It is only when no liquid is being delivered that an attendant and the customer can see the price indicated on the price register.

A still further form of the invention may consist of means responsive to flow of the liquid through the conduits connecting the pump to the meter and the dispensing hose 20. As illustrated in Figure 4, a suitable form of device for moving the shutter in response to flow of liquid may consist of a plate element 70 mounted on a shaft 72 journaled in a liquid conduit 74, through which the liquid passes during a dispensing operation. The shaft 72 may be provided with a lever 76 connected through a link 78 to the lever 56 on shutter arm 52. With this construction, flow of liquid through the conduit 64 will displace the plate element 70, rotating the shaft 72 and lever 76 and swinging the shutter arm 62 in a clockwise direction to conceal the drums on the price register. Stoppage of flow through the conduit 74 will allow the plate 70 to return to its normal position perpendicular to the direction of flow of the liquid and the shutter arm 52 to rock counterclockwise to expose the price register through the aperture 14 in the pump housing. The plate 70 may be suitably weighted by a counterbalance weight 80 to return it to position on stoppage of liquid flow.

It will be seen from the above description of the various forms embodying the present invention that I have produced a simple, effective mechanism for preventing display of price during a dispensing operation and thereby complying with the laws in effect in certain States which prevent the dispensing of gasoline by price only. My novel construction nevertheless allows both the customer and the attendant to determine quickly and accurately the price of the liquid dispensed in any single dispensing operation without reference to charts or without unnecessary calculations.

It will be understood that the above described constructions are susceptible of many variations without departing from the concept of the invention and therefore these embodiments should be considered illustrative only and not as limiting the scope of the claims.

I claim:

1. In a liquid dispensing device, the combination of a price indicator, a volume indicator, a meter, means actuated by said meter for driving said indicators, a movable hose support, a shutter associated with said price indicator and movable to conceal and expose said indicator, and means positively connecting said shutter and hose support for moving the shutter to conceal the indicator when the hose is removed from the support and to expose said indicator when the hose is placed on the support.

2. In a liquid dispensing device, the combination of a volume indicator, a price indicator, a meter, means actuated by the meter for driving the indicators, a shutter associated with the price indicator and movable to conceal and expose the indicator, means for forcing liquid through the meter, and means actuated by flow of liquid through the meter for moving the shutter to indicator concealing position.

3. In a liquid dispensing device, the combination of a volume indicator, a price indicator, a meter means for driving said indicators, means supplying liquid to said meter, a dispensing hose, conduits connecting the liquid supplying means, the meter and the dispensing hose, a shutter associated with the price indicator movable to positions concealing and exposing the price indicator and means disposed in a conduit and actuated by flow of liquid therethrough to move the shutter to indicator concealing position.

4. The dispensing device set forth in claim 3 wherein the means for moving the shutter comprises an element pivotally mounted in the conduit.

5. In a dispensing device, the combination of liquid forcing means, a meter actuated by the liquid forcing means, a price register and a volume register driven by said meter, a dispensing hose connected to said meter for delivering liquid, a nozzle on said hose, a valve in said nozzle for controlling delivery of liquid, a shutter for concealing and exposing said price register and means connecting said valve and said shutter for moving said shutter to conceal the price indicator when the valve is open.

6. In a liquid dispensing device, the combination of means for initiating flow of liquid, a meter actuated by flow of the liquid, a volume register actuated by the meter, a price register having elements actuated by the meter, said price register including an element operable to control the display of the price of liquid being dispensed a movable hose support connected to the means for initiating flow of liquid, and means connecting said element to the hose support and actuated by movement of the hose support to prevent a display of the price of liquid dispensed during a dispensing operation and to display the total price of the liquid dispensed upon the termination of the dispensing operation.

7. In a liquid dispensing device having volume and cost indicators, means for delivering liquid and movable means for controlling the delivery of liquid; the combination of a shutter adapted to conceal and expose the cost indicator, a pivoted arm for supporting said shutter adjacent said cost indicator and connecting means between said arm and said liquid delivery controlling means for moving and maintaining said shutter in indicator concealing position during the delivery of liquid, and for moving said shutter to indicator exposing position when delivery of liquid is discontinued.

8. In a liquid dispensing device having volume and cost indicators, liquid flow initiating and stopping means; the combination of an element movable in response to the initiation and the stopping of liquid flow, a shutter for concealing and exposing said cost indicator, a pivoted arm for supporting said shutter adjacent said cost indicator and connecting means between said arm and said movable element for moving said shutter to indicator concealing position upon the initiation of liquid flow and to indicator exposing position upon the stopping of liquid flow.

WILLIAM L. MARDEN.